Figure 1:
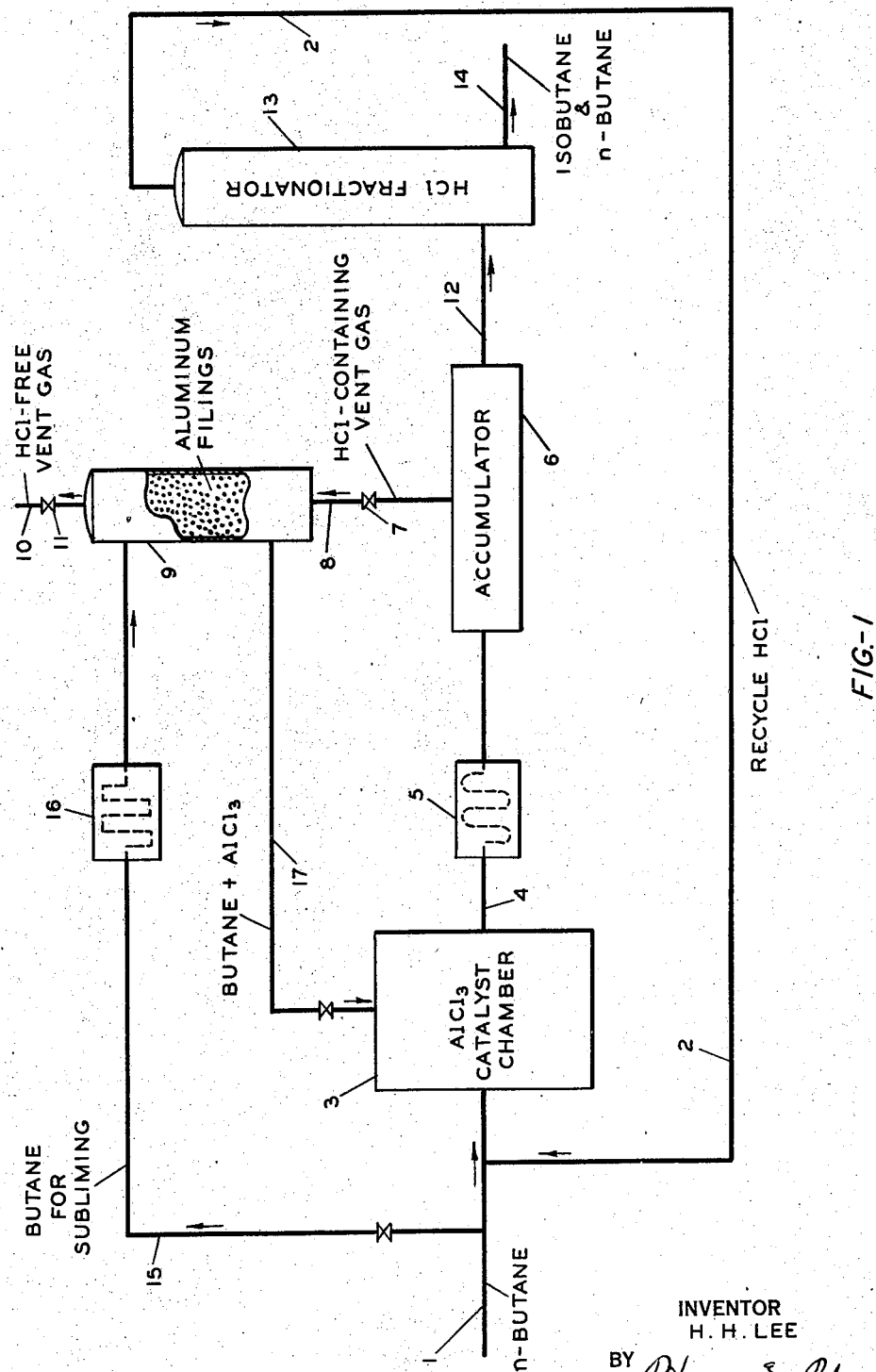

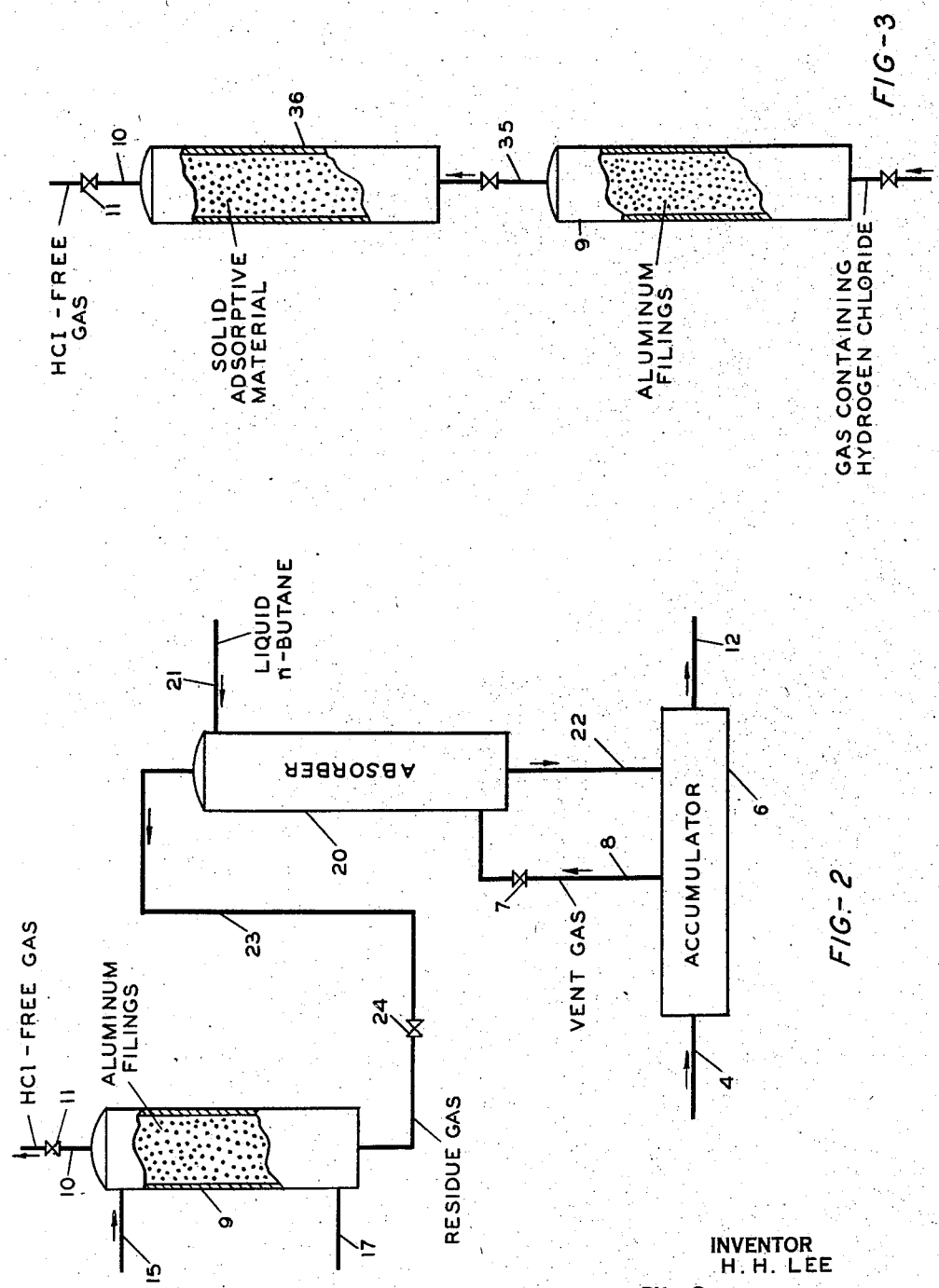

Patented Oct. 14, 1947

2,428,883

UNITED STATES PATENT OFFICE 2,428,883

REMOVAL OF HYDROGEN HALIDE FROM A GASEOUS EFFLUENT OF AN ISOMERIZATION PROCESS

Henry H. Lee, Bartlesville, Okla., assignor to Phillips Petroleum Company, a corporation of Delaware Application January 22, 1945, Serial No. 573,995

7 Claims. (Cl. 260—683.5)

This invention relates to a process of conducting a reaction catalyzed by a Friedel-Crafts metal halide catalyst activated with the corresponding hydrogen halide, especially aluminum chloride activated with hydrogen chloride. Still more particularly it relates to a process of carrying out a catalytic hydrocarbon conversion of this type, especially the isomerization of normal butane to isobutane.

In reactions of the foregoing type it is often customary to condense the total gaseous reaction effluent and to fractionally distill the condensate to recover the hydrogen halide therefrom which is recycled to the reaction zone. For example, in the isomerization of normal butane to isobutane, the total gaseous reaction effluent is customarily condensed and the condensate fractionated to recover the hydrogen chloride therefrom which is recycled to the isomerization zone. Small amounts of light non-condensible gases are formed and must be periodically or continuously vented from the reaction effluent condensate accumulator. These gases contain some hydrogen chloride which must either be wasted or recovered by some suitable means. So far as I am aware no completely satisfactory method of removing the hydrogen chloride from such non-condensible gases is available.

The principal object of the present invention is to provide an improved method of carrying out reactions catalyzed by a Friedel-Crafts metal halide catalyst activated with the corresponding hydrogen halide. Another object is to recover hydrogen halide from admixture with difficultly condensible or non-condensible gases especially from vent gases or the like. Another object is to recover residual hydrogen chloride from effluent or vent streams of a hydrocarbon conversion process in which aluminum chloride activated with hydrogen chloride is employed as the catalyst. Another object is to provide a process of the foregoing type applied to the isomerization of normal paraffins to isoparaffins, particularly normal butane to isobutane. A further object is to recover the hydrogen halide in the form of the metal halide which is used to catalyze the reaction and to return the hydrogen halide so recovered to the reaction in the form of the metal halide suitable for use as a catalyst of the Friedel-Crafts type. Another object is to recover hydrogen chloride from admixture with light gases such as hydrogen, methane, ethane, propane and butane. Other objects will be apparent to those skilled in the art from the following disclosure.

In the accompanying drawings:

Fig. 1 portrays diagrammatically one arrangement of equipment for carrying out the process of the present invention. While the process illustrated is the isomerization of normal butane to isobutane by means of aluminum chloride and hydrogen chloride, it will be understood that my invention may be applied to any conversion with any polyvalent metal halide catalyst of the Friedel-Crafts type and the corresponding hydrogen halide as a promoter where a gaseous hydrogen halide-containing stream is encountered.

Fig. 2 portrays a modification of Fig. 1 wherein a liquid butane absorber is interposed between the bed of metallic aluminum and the fractionator feed tank for the purpose of eliminating loss of butane in the vent gases.

Fig. 3 portrays a further embodiment of the invention wherein the aluminum chloride formed is caused to deposit on a solid adsorptive material in a separate chamber.

As the metal halide, I prefer to use aluminum chloride since it is cheap, readily obtained and very effective. However, I may use aluminum bromide or aluminum iodide, although the latter is so expensive that its use is almost out of question. I may use any of the normally solid chlorides, bromides or iodides of other suitable polyvalent metals such as zinc, tin, antimony, zirconium, beryllium, titanium and iron. Usually metals whose hydroxides are amphoteric are preferred.

As the hydrogen halide, I prefer to use hydrogen chloride although hydrogen bromide or, very rarely, the iodide may be employed; hydrogen fluoride is not suitable.

As indicated above, the invention is applicable to various organic conversion processes in which a metal halide of the Friedel-Crafts type, for example, aluminum chloride, aluminum bromide, zinc chloride, zirconium tetrachloride, tin bromide, ferric chloride, or the like, is used in conjunction with the corresponding hydrogen halide as activator. By "corresponding hydrogen halide" I mean that the halogen of the hydrogen halide is the same as that of the metal halide catalyst. For purposes of illustration the invention will be described as applied to the catalytic isomerization of normal butane. Its application to other reactions, such as the alkylation of isobutane with ethylene to form diisopropyl, the hydrohalogenation of olefins, or any other reaction wherein there is produced a mixture of hydrogen halide and a light gas will be apparent. The invention may be applied to a gaseous reaction effluent or to a gaseous fraction thereof which contains the hydrogen halide and the light gas.

In accordance with one embodiment of my invention hydrogen chloride is recovered from the vent gases by contacting the vented gases with metallic aluminum, preferably in the form of filings, powder, turnings or other comminuted or extended forms which give a large surface area. The vent gases are preferably passed through a vessel containing the metallic aluminum wherein the hydrogen chloride and aluminum react to form aluminum chloride and hydrogen. This method of operating provides a mechanically simple means for accomplishing the removal of hydrogen chloride, insures an acid-free vent gas, thus avoiding the necessity of a caustic wash, and converts the hydrogen chloride into a form useful in the process. When sufficient aluminum chloride has been formed to diminish the effectiveness of the body of metal and/or to make the recovery of aluminum chloride worthwhile the aluminum chloride so formed is preferably introduced into the reaction chamber to serve as makeup catalyst.

A preferred method of accomplishing the introduction of the aluminum chloride formed into the reaction chamber is to isolate the body of metal containing aluminum chloride from contact with vent gases and to pass therethrough a hot stream of normal butane feed or other suitable carrying agent at temperatures sufficient to volatilize the aluminum chloride. The hot butane stream is then passed into the reaction zone where the aluminum chloride is deposited by simple condensation or adsorption on an adsorptive support, or by other suitable means. Generally, this step may be repeated a number of times before the aluminum metal is completely used up, and the body of the metal is returned to service in scrubbing vent gases after each recovery of aluminum chloride therefrom.

Alternatively, the vent gases going to the body of metal may be periodically heated to a sufficient temperature to sublime the aluminum chloride, and the effluents from the metal carrying vaporous aluminum chloride passed to the reaction zone. Of course, other streams in the system which contain hydrogen chloride to be recovered may be treated in a manner similar to that described herein for the vent gases. The temperature for contacting the hydrogen chloride-bearing stream with the metal may be substantially atmospheric or higher or lower, as may be most expedient for a given stream and a given metal.

In case a metal halide other than aluminum chloride is being used as catalyst, for example, ferric chloride, the corresponding metal, for example, iron, is used. While the metal halide may be returned to the reaction zone by vaporization as described above, it may also be returned by solution in liquid hydrocarbon materials or in other suitable manners.

In its broader aspects the present invention is a method of removing hydrogen halide from a normally gaseous mixture containing same and at least one other normally gaseous material which is inert with respect to the metal under the conditions of the treatment. This method involves intimately contacting the mixture with a mass of metal having an extended surface and capable of reacting with the hydrogen halide to form a normally solid polyvalent metal halide, but inert with respect to the other components of the gaseous mixture being treated under the existing conditions. Conditions are employed such that the hydrogen halide content of the mixture selectively reacts with the metal to form the solid metal halide.

More specifically the present invention involves a method of carrying out a reaction, such as a hydrocarbon conversion, catalyzed with a normally solid polyvalent metal halide of the Friedel-Crafts type activated with the corresponding hydrogen halide by recovering from the reaction zone, as by recovery from the reaction effluent, a gaseous stream containing hydrogen halide and at least one other normally gaseous material, usually a paraffin hydrocarbon such as butane, propane, ethane, methane, or mixtures thereof, and intimately contacting this gaseous mixture with a mass of a metal corresponding to the metal in the metal halide catalyst in a form such as to present a relatively large surface area under conditions such that the hydrogen halide content of the gaseous mixture is caused to react with the metal and converted to the metal halide. Usually the metal halide is retained in solid form in association with the metal. In any event the metal halide thus formed is ultimately employed in the reaction as catalyst therefor, by passage to the original reaction zone or to another reaction zone which is to be placed onstream.

Removal of the metal halide and its transfer to the reaction zone are generally accomplished by contacting the mass of metal and metal halide with a fluid medium which removes the metal halide, by solution or vaporization, from association with the metal, and passing the resulting mixture into the reaction zone where the vaporized metal halide is caused to deposit on the solid adsorptive carrier provided therein as a catalyst support. Normally the fluid medium is a hot stream of the vaporized hydrocarbon to be converted which is passed through the mass of metal and metal halide to vaporize the metal halide at periodic intervals.

Usually conditions are so adjusted that the metal halide is retained in solid form in association with the metal, i. e., in and around the highly extended mass of metal. This is easily accomplished by maintaining temperature and pressure such that the metal halide is not sublimed. However, under exceptional conditions, it may be desirable to allow the metal halide to volatilize into the stream of gases being treated for removal of hydrogen halide; the resulting vaporous metal halide-containing stream is then treated in any suitable way to separate the metal halide content thereof, for example, by passage through a mass of solid adsorptive carrier contained in a suitable chamber such as a vessel which is to be placed onstream as a reactor as soon as the requisite level of metal halide has condensed onto the carrier.

The separation of hydrogen chloride, bromide and iodide from admixture with light hydrocarbons is a problem of great difficulty. In most cases separation by fractional distillation is out of the question because of the amounts of refrigeration required for liquefaction and the closeness of the boiling points. The boiling points of the components generally encountered are as follows:

| | ° F. |
|---|---|
| Methane | −258 |
| Ethane | −127 |
| Hydrogen chloride | −121 |
| Hydrogen bromide | − 83 |
| Propane | − 44 |
| Hydrogen iodide | − 32 |
| Isobutane | + 10 |
| Normal butane | + 31 |

The separation of ethane and hydrogen chloride is exceedingly difficult because the boiling points are so close. In butane isomerization plants it is fairly common to effect the separation of hydrogen chloride from admixture with propane, ethane and methane by absorption in liquid normal butane, the rich liquid butane being passed to the hydrogen chloride fractionator feed tank; while this effects a fairly good separation from methane (and any hydrogen present) an excessive amount of ethane is dissolved and pyramids in the isomerization system; ethane causes serious difficulty since it is dissolved by the butane, goes overhead in the hydrogen chloride fractionator and appears in the hydrogen chloride recycle stream; while a great deal of propane dissolves in the butane this causes no difficulty since it goes out the bottom of the hydrogen chloride fractionator and is eliminated in the isobutane recovery. The foregoing method is disclosed and claimed in the copending application of K. H. Hachmuth, Ser. No. 460,875, filed October 5, 1942.

The present invention eliminates the foregoing difficulty of separating hydrogen chloride and ethane and may be applied in place of the liquid butane absorber or to the residue gas from the liquid butane absorber where it contains hydrogen chloride.

The present invention may be employed to separate hydrogen chloride from any mixture containing hydrogen chloride and ethane whether other normally gaseous components be present or absent.

The present invention is applicable to mixtures of any of the three hydrogen halides with hydrogen, with methane, with ethane, with propane, with butane or with any two or more of these gases. It is especially applicable to mixtures containing such a small amount of hydrogen halide that removal of the hydrogen halide by known methods is not desirable either because of the expense, as in the case of fractional distillation or absorption methods, or because the hydrogen halide is converted to a relatively valueless material as is the case where a caustic wash is used. My invention effects removal of the hydrogen halide from such dilute streams in a form which is valuable, namely, in the form of the halide of aluminum or similar Friedel-Crafts type catalyst usable directly in the reaction.

If isomerization conditions are such that cracking takes place in the reaction zone to a limited extent, a small amount of hydrogen may appear in the reaction effluent and thus in the vent gases; however, the art has now developed to the point where it is possible to operate commercially in such manner that no hydrogen is formed in the isomerization zone.

The temperature at which the gaseous mixture containing hydrogen halide and hydrogen, methane, ethane, propane, butane and heavier, or mixtures thereof, is contacted with the body of metal is preferably such that the reaction takes place at a satisfactory rate but below the point where the metal halide formed would be vaporized into the gaseous effluent at an appreciable rate. Ordinarily the temperature will range from atmospheric, i. e., 70° F. to 300° F. In the case of hydrogen chloride the temperature preferably does not exceed 200° F. because otherwise aluminum chloride might volatilize to an objectionable extent.

The pressure at which the metal contacting is conducted may vary within wide limits usually ranging from atmospheric up to the reaction pressure say 300 pounds.

The entire system is preferably maintained anhydrous. The presence of water in the isomerization of paraffins is deleterious and for this reason water is rigidly excluded from all parts of the system.

Referring now to the drawing, normal butane feed enters via line 1, is admixed with recycle hydrogen chloride via line 2 and enters reaction chamber 3 which is packed with aluminum chloride deposited on the usual solid adsorptive carrier such as "Porocel." Conditions in reactor 3 are adjusted so as to effect the desired degree of isomerization; the selection of conditions is now well within the skill of the art. The reaction effluent in vapor phase passes via line 4 to cooler 5 where the portion thereof which is condensible with ordinary plant cooling water is condensed. The resulting mixture passes to accumulator or fractionator feed tank 6. The light gases are vented from the condensate through line 8 containing block valve 7 and passed through vessel 9 packed with aluminum metal in any form which presents a very highly extended surface so as to ensure complete removal of hydrogen chloride. The hydrogen chloride-free residue gas leaves via line 10 and pressure reducing valve 11.

The liquid in feed tank 6 is fed via line 12 to hydrogen chloride fractionator 13, which is generally operated as a stripper, to remove substantially all of the hydrogen chloride in admixture with propane and any lighter components via line 2. The overhead from column 13 constitutes the hydrogen chloride recycle. A bottom product of some propane, and substantially all of the unconverted normal butane and isobutane (together with any heavier components) is removed from column 13 via line 14 and passed to the usual recovery system (not shown).

When it is desired to remove the aluminum chloride accumulating in the bed of aluminum, vessel 9 is isolated from the vent gases by closing valves 7 and 11. A stream of feed butane is then passed via line 15 through heater 16 where it is heated to bring it to a temperature such that it will volatilize aluminum chloride, say to 290 to 370° F., and is then passed through the mass of granular aluminum in vessel 9, the resulting vapors of normal butane and volatilized aluminum chloride being fed into the reactor 3 via line 17 and the aluminum chloride being caused to deposit on the carrier therein. The hydrogen chloride recycle is discontinued during a subliming operation.

Fig. 2 portrays a modification of Fig. 1 which represents an especially advantageous application of my invention. In the isomerization of normal butane where a liquid butane absorption step is applied to the off-gases from the condensate accumulator to recover all of the hydrogen chloride content therefrom, a very serious problem is presented by reason of the absorption of ethane which is thus kept in the isomerization system and is most objectionable because it pyramids and soon attains such a concentration or partial pressure in the gaseous system that satisfactory isomerization is impossible. Consequently, under present practice it is necessary to occasionally blow off or vent enough gas from the condensate to reduce the ethane concentration to satisfactory levels; this is objectionable because a large amount of valuable hydrogen chloride is thus lost. In accordance with my invention this difficulty is overcome by letting some of the ethane and hydrogen chloride go through the liquid butane absorber and recovering the hydrogen chloride from the residue gas of the absorber by reaction with metallic aluminum.

Thus, in Fig. 2 the vent gases from condensate accumulator 6 are passed by line 8 containing shutoff valve 7 to absorber 20 and therein scrubbed with liquid normal butane entering via line 21. The liquid butane removes most of the hydrogen chloride content of the gaseous stream. Of course, most of the propane and some ethane are also dissolved. The resulting rich absorbent is passed via line 22 into the accumulator 6 where it merges with the condensate therein and whence it is passed to the recovery system.

The residual gas leaves absorber or scrubber 20 via line 23 containing block valve 24 and contains some hydrogen chloride and ethane, the operation of absorber 20 having been adjusted to this end, whereby the ethane is removed at a rate such as to keep it from building up in the isomerization reaction zone. The residue gas is passed into the body 9 of aluminum metal as before and the hydrogen chloride content thereof caused to react and be converted to aluminum chloride. The resulting gas is removed via line 10 and pressure reducing valve 11.

In the embodiment of Fig. 3 the reaction of the hydrogen chloride is carried out in unit 9 which is operated under conditions such that the resulting aluminum chloride is retained in vapor phase. The resulting gas containing the aluminum chloride is passed via line 35 into vessel 36 which is packed with solid adsorptive material such as "Porocel" and maintained under such conditions that the aluminum chloride is deposited. The hydrogen chloride-free and aluminum chloride-free gaseous effluent is withdrawn via line 10. Valve 11 is provided as before for reducing the pressure on the tank 6. The arangement shown is very advantageous since it eliminates the necessity for maintaining conditions in unit 9 which will favor the reaction and also cause the aluminum chloride to deposit. These requirements are often irreconcilable since they oppose one another, conditions which favor the reaction, such as elevated temperature, often tending to prevent deposition of metal halide reaction product in solid form in the reaction zone. By means of the arrangement shown a high temperature can be employed in zone 9 while zone 36 can be kept relatively cold so as to effect condensation of all of the vaporous aluminum chloride. In some cases a similar effect may be achieved by providing a bed of metallic aluminum 9, the forepart of which is maintained hot and the balance cold in order to cause condensation of the aluminum chloride from the gases before they leave the bed.

When using the arrangement of Fig. 3 in connection with a hydrocarbon conversion as in Figs. 1 or 2, the mass of solid carrier containing aluminum chloride formed in unit 36 may be removed and transferred to the reaction zone whenever the carrier has become spent for the adsorption of aluminum chloride to the desired degree.

It is advantageous to provide for the reduction of pressure after the gases being treated have passed through the body of metal 9 or units 9 and 36 rather than ahead of the mass of metal 9, since the higher pressure thus achieved facilitates the deposition and retention of the aluminum chloride by the metal 9 or the adsorptive body 36.

*Example*

Using equipment like that portrayed in Fig. 1 of the drawings, normal butane was passed at the rate of 160–170 barrels an hour through line 1 to reactor 3 in admixture with 3½ to 4 mol per cent of hydrogen chloride based on total reactor feed. Reactor 3 was packed with Porocel carrying ½ to 1 per cent by weight of aluminum chloride per sublimation, and was operated at a temperature ranging from 220° F. at the start up to 280° F. at the end of an on-stream run. The pressure was maintained at about 250 pounds gauge. Pressure drop through the catalyst chamber was about 25 pounds. Under these conditions about 40 per cent conversion of normal butane to isobutane was obtained.

The reaction effluent was cooled in cooler 5 to 120–130° F. and the resulting mixture of condensate and non-condensible gases was passed to accumulator 6. The gaseous phase was separated through line 8 and analyzed approximately as follows:

| | Mol per cent |
|---|---|
| Hydrogen chloride | 20 |
| Hydrogen | 30 |
| Methane | 15 |
| Ethane | 10 |
| Propane | 5 |
| Isobutane | 10 |
| Normal butane | 10 |

This was passed at the pressure of about 225 pounds and at a temperature of 120–130° F. through a mass 9 of aluminum filings as in the drawing. The effluent gas vented via line 10 had the following approximate analysis:

| | Mol per cent |
|---|---|
| Hydrogen | 37.5 |
| Methane | 19.0 |
| Ethane | 12.5 |
| Propane | 6.0 |
| Isobutane | 12.5 |
| Normal butane | 12.5 |

After the vent gas had been passed through the mass of aluminum to such an extent that it contained about 10 per cent by weight of aluminum chloride the unit 9 was isolated by closing valves 7 and 11 and the aluminum chloride was removed by passing a stream of normal butane feed at 300° F. therethrough and thence into catalyst chamber 3. During the subliming operation the normal feed and the recycle of hydrogen chloride were discontinued.

From the foregoing description many advantages of my invention will be apparent to those skilled in the art. One advantage is that it provides a simple method of removing hydrogen halide from admixture with normally gaseous materials. Another advantage is that it provides a method of recovering hydrogen halide from vent gases or the like which normally are sent to waste with the hydrogen halide therein. Another advantage is that the invention makes feasible the recovery of hydrogen halide from gases containing same in concentration so low that the halide cannot be economically recovered by known methods. Another advantage is that the hydrogen halide is recovered in a form directly usable as a catalyst in a conversion such as that with which the recovery system may be associated. Another advantage is that the recovery is accomplished without requiring large amounts of refrigeration or expensive equipment as would be the case were it attempted to recover the hydrogen halide by fractional distillation.

The principal advantages of the present invention are realized in its application to isomerization of butane. Foremost among them is the fact that the present invention provides a method of preventing ethane from building up in the isomerization system without the total loss of expensive anhydrous hydrogen chloride. Another advantage is that the process of the present invention yields no by-products which would have to be disposed of; the aluminum chloride, the only product of the process, is directly usable as a catalyst in the isomerization. Another advantage is that a simple and economical method of transferring the aluminum chloride formed to the catalyst chamber is provided and the body of aluminum metal is readily regenerated after aluminum chloride has built up therein. Many other advantages of the present invention will be apparent to those skilled in the art.

In some metal halide-catalyzed isomerizations, such as isomerization of normal pentane to isopentane, isomerization of naphtha, the gaseous hydrogen halide-containing stream to be treated in accordance with the present invention may contain small quantities of hydrocarbons heavier than butane such as normal pentane or isopentane.

I claim:

1. In a process for the isomerization of butane wherein the reaction occurs in a reaction zone in the presence of a volatilizable aluminum halide catalyst activated with the corresponding hydrogen halide and a vaporous effluent containing at least one normally gaseous paraffin hydrocarbon and hydrogen halide is withdrawn from said reaction zone that improvement which comprises intimately contacting said vaporous effluent with a mass of metallic aluminum in such form as to present a relatively large surface area and at a temperature of from 70° to 300° F., reacting substantially all hydrogen halide contained in said vaporous effluent with said aluminum metal to form aluminum halide, causing the aluminum halide thus formed to remain in solid form in association with said metal and subsequently returning said aluminum halide thus formed to the reaction zone.

2. In a process for the isomerization of butane wherein the reaction occurs in a reaction zone in the presence of a volatilizable aluminum halide catalyst activated with the corresponding hydrogen halide and a vaporous effluent containing at least one normally gaseous paraffin hydrocarbon and hydrogen halide is withdrawn from said reaction zone that improvement which comprises condensing said vaporous effluent, venting from the condensate a normally gaseous mixture containing hydrogen halide and paraffin hydrocarbon, intimately contacting said normally gaseous mixture with a mass of metallic aluminum in such form as to present a relatively large surface area and at a temperature of from 70° to 300° F., reacting substantially all hydrogen halide contained in said normally gaseous mixture with said aluminum metal to form aluminum halide, causing the aluminum halide thus formed to remain in solid form in association with said metal and subsequently returning said aluminum halide thus formed to the reaction zone.

3. The method of carrying out the isomerization of normal butane to isobutane with a catalyst of aluminum chloride activated with hydrogen chloride which comprises conducting said isomerization in a reaction zone containing a catalyst of aluminum chloride supported on a solid adsorptive carrier, withdrawing the reaction effluent in vaporous form from said zone, cooling said effluent to effect condensation of the condensible portion thereof, venting from the condensate a normally gaseous mixture containing hydrogen chloride and paraffin hydrocarbons, intimately contacting said gaseous mixture with a mass of metallic aluminum in such form as to present a relatively large surface area under conditions such that the hydrogen chloride content of said gaseous mixture reacts with said aluminum to form aluminum chloride and that said aluminum chloride is retained in solid form in association with said aluminum, periodically discontinuing said contacting and passing a stream of hot normal butane into contact with the mass of aluminum chloride and aluminum and thereby volatilizing the aluminum chloride into said butane, passing the resulting vaporous mixture into a reaction zone containing a solid adsorptive carrier under conditions such that the volatilized aluminum chloride is deposited onto said carrier by condensation, and thereafter carrying out isomerization of normal butane to isobutane in the resulting reaction zone.

4. The process of conducting a hydrocarbon isomerization catalyzed by aluminum chloride activated with hydrogen chloride which comprises carrying out said isomerization in a reaction zone containing a solid adsorptive carrier supporting aluminum chloride, withdrawing from the reaction mixture a normally gaseous mixture containing hydrogen chloride and paraffin hydrocarbons, passing said gaseous mixture through a body of metallic aluminum having an extended surface and thereby removing the hydrogen chloride from the gaseous mixture by converting same to aluminum chloride, causing said aluminum chloride to be retained in solid form in said body of metallic aluminum, periodically discontinuing flow of said mixture through said body and subliming said aluminum chloride therefrom by passing a stream of hot incoming hydrocarbon vapors therethrough and then into said reaction zone under conditions such that said aluminum chloride is deposited on said carrier, and then resuming passage of said mixture through said body of metallic aluminum.

5. The process of claim 1 wherein the temperature during said contacting step ranges between 70° F. and 200° F.

6. In the isomerization of normal butane to isobutane with aluminum chloride as a catalyst promoted with hydrogen chloride, wherein the reaction effluent is treated to separate a gaseous phase containing methane, ethane, propane, hydrogen chloride and butane and wherein said gaseous phase is scrubbed with liquid normal butane to remove therefrom most of the hydrogen chloride contained therein, the resulting enriched liquid butane being returned to the isomerization system, the improvement which comprises preventing ethane from building up to an objectionable extent in the isomerization system by operating said scrubbing step in such manner that enough of ethane appears in the residue gas from the scrubbing step to prevent ethane from pyramiding in the isomerization system, intimately contacting the residue gas with a mass of aluminum metal under such conditions that substantially all the hydrogen chloride content thereof reacts with said metal and is converted to solid aluminum chloride, and separating the resulting gas containing said ethane from the aluminum chloride in solid form and from the system.

7. In the process of claim 6 the further feature of employing the aluminum chloride formed by said reaction in the isomerization reaction.

HENRY H. LEE.

REFERENCES CITED

The following references are of record in the file of this patent:

UNITED STATES PATENTS

| Number | Name | Date |
|---|---|---|
| 2,300,235 | Pines et al. | Oct. 27, 1942 |
| 2,281,924 | de Simo et al. | May 5, 1942 |
| 2,354,851 | Danforth | Aug. 1, 1944 |
| 2,348,770 | Welensky et al. | May 16, 1944 |
| 2,265,548 | Schuit | Dec. 9, 1941 |
| 2,373,803 | Baker et al. | Apr. 17, 1945 |
| 2,395,680 | Nysewander et al. | Feb. 26, 1946 |
| 2,392,284 | Gage | Jan. 1, 1946 |

OTHER REFERENCES

Ralston, Anhydrous Aluminum Chloride, tech. paper 321, Bureau of Mines (1923), pages 11 and 12.